United States Patent
Ely

(10) Patent No.: US 9,767,572 B2
(45) Date of Patent: Sep. 19, 2017

(54) SYSTEMS AND METHODS FOR 3D POINT CLOUD PROCESSING

(71) Applicant: Raytheon Company, Waltham, MA (US)

(72) Inventor: Richard W. Ely, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 326 days.

(21) Appl. No.: 14/701,801

(22) Filed: May 1, 2015

(65) Prior Publication Data

US 2016/0321820 A1  Nov. 3, 2016

(51) Int. Cl.
| | | |
|---|---|---|
| G06K 9/00 | (2006.01) | |
| G06T 7/254 | (2017.01) | |
| G06T 7/246 | (2017.01) | |

(52) U.S. Cl.
CPC ............ *G06T 7/254* (2017.01); *G06T 7/246* (2017.01); *G06T 2207/10016* (2013.01); *G06T 2207/10024* (2013.01); *G06T 2207/10028* (2013.01)

(58) Field of Classification Search
CPC ............ G06T 7/254; G06T 7/246; G06T 2207/10016; G06T 2207/10024; G06T 2207/10028
See application file for complete search history.

(56) References Cited

U.S. PATENT DOCUMENTS

| | | | |
|---|---|---|---|
| 2009/0244309 A1* | 10/2009 | Maison | G06K 9/00369 348/222.1 |
| 2010/0209013 A1* | 8/2010 | Minear | G06T 7/32 382/260 |
| 2010/0302247 A1* | 12/2010 | Perez | G06K 9/00201 345/440 |
| 2011/0115812 A1* | 5/2011 | Minear | G06T 17/00 345/593 |
| 2013/0002866 A1* | 1/2013 | Hampapur | G06T 7/277 348/143 |
| 2013/0202197 A1* | 8/2013 | Reeler | G01S 17/89 382/154 |

(Continued)

OTHER PUBLICATIONS

Held, David, et al. "Combining 3D Shape, Color, and Motion for Robust Anytime Tracking." Robotics: science and systems. 2014.*

(Continued)

*Primary Examiner* — Jonathan S Lee
(74) *Attorney, Agent, or Firm* — Schwegman Lundberg & Woessner, P.A.

(57) ABSTRACT

Generally discussed herein are systems, apparatuses, and methods for moving object detection. In one or more embodiments, a method can include computing a central value for each color of each pixel in a series of frames from a static imaging device to create a static reference frame, computing a difference between pixel values of a first frame captured after the series of frames by the static imaging device and a central value of a corresponding pixel value in the static reference frame, comparing the computed differences to a difference threshold, aggregating contiguous pixels corresponding to differences greater than the difference threshold into contiguous segments of pixels, and determining if the contiguous segments correspond to a moving object by registering the contiguous segments to pixels of a frame preceding the first frame.

20 Claims, 9 Drawing Sheets

(56) References Cited

U.S. PATENT DOCUMENTS

| | | | | |
|---|---|---|---|---|
| 2014/0118716 A1* | 5/2014 | Kaganovich | ............ | G01S 17/89 356/4.01 |
| 2015/0193963 A1* | 7/2015 | Chen | .................... | G06K 9/0063 345/426 |

OTHER PUBLICATIONS

Ochs, Peter, Jitendra Malik, and Thomas Brox. "Segmentation of moving objects by long term video analysis." IEEE transactions on pattern analysis and machine intelligence 36.6 (2014): 1187-1200.*

Held, David, Jesse Levinson, and Sebastian Thrun. "Precision tracking with sparse 3D and dense color 2D data." Robotics and Automation (ICRA), 2013 IEEE International Conference on. IEEE, 2013.*

Brostow, Gabriel, et al. "Segmentation and recognition using structure from motion point clouds." Computer Vision-ECCV 2008 (2008): 44-57.*

Teichman, Alex, Jake T. Lussier, and Sebastian Thrun. "Learning to Segment and Track in RGBD." IEEE Transactions on Automation Science and Engineering 10.4 (2013): 841-852.*

Shin, Yong-Deuk, et al. "Moving objects detection using freely moving depth sensing camera." Pattern Recognition (ICPR), 2012 21st International Conference on. IEEE, 2012.*

Ioannou, Yani, et al. "Difference of normals as a multi-scale operator in unorganized point clouds." 3D Imaging, Modeling, Processing, Visualization and Transmission (3DIMPVT), 2012 Second International Conference on. IEEE, 2012.*

Herbst, Evan, Xiaofeng Ren, and Dieter Fox. "Rgb-d flow: Dense 3-d motion estimation using color and depth." Robotics and Automation (ICRA), 2013 IEEE International Conference on. IEEE, 2013.*

Gomes, Rafael Beserra, et al. "Efficient 3D object recognition using foveated point clouds." Computers & Graphics 37.5 (2013): 496-508.*

Fleder, M., Pillai, S., Scott, J., 3D Object Tracking Using the Kinect, MIT CSAIL, pp. 1-8.*

Finman, Ross, et al. "Toward lifelong object segmentation from change detection in dense RGB-D maps." Mobile Robots (ECMR), 2013 European Conference on. IEEE, 2013.*

* cited by examiner

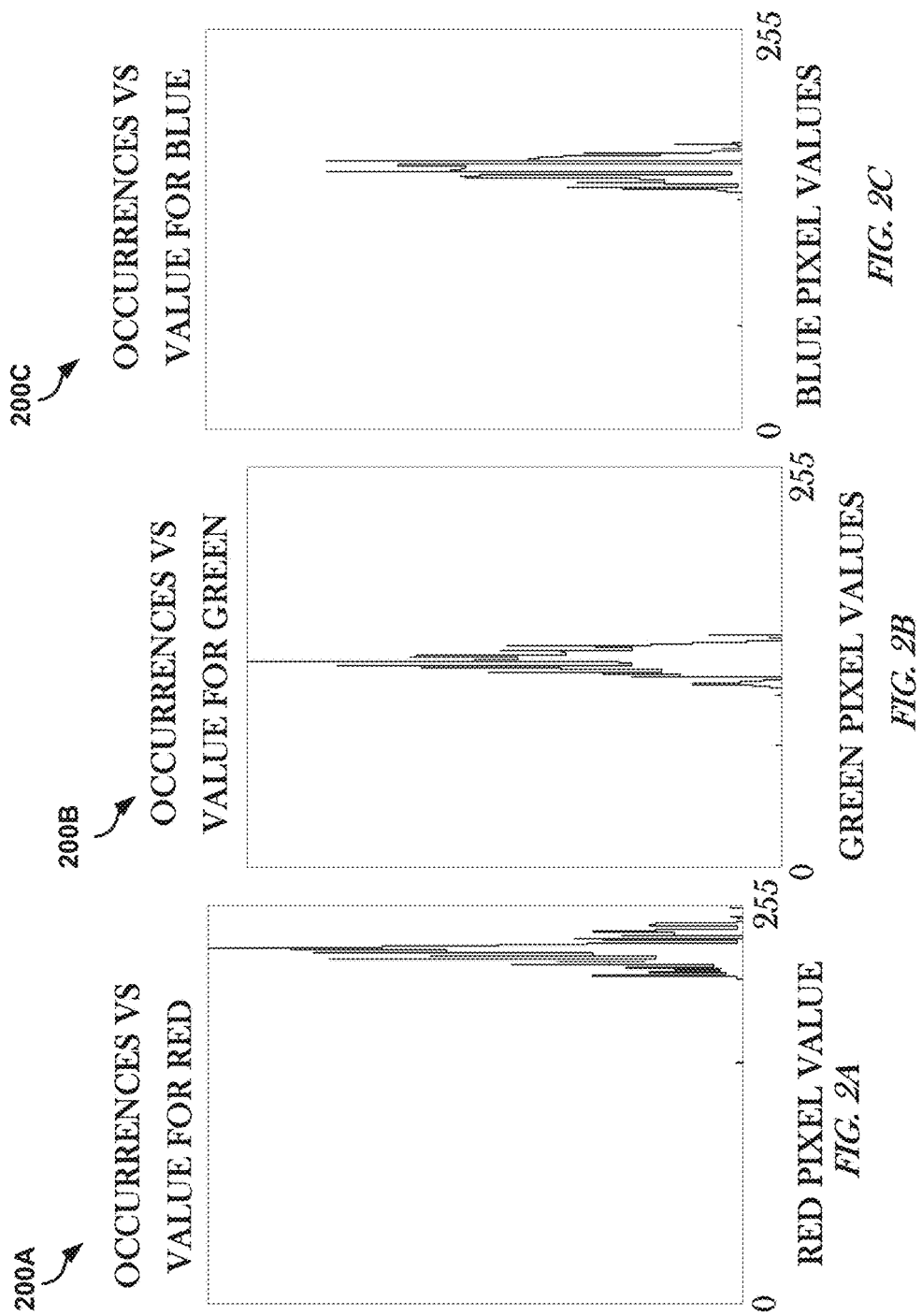

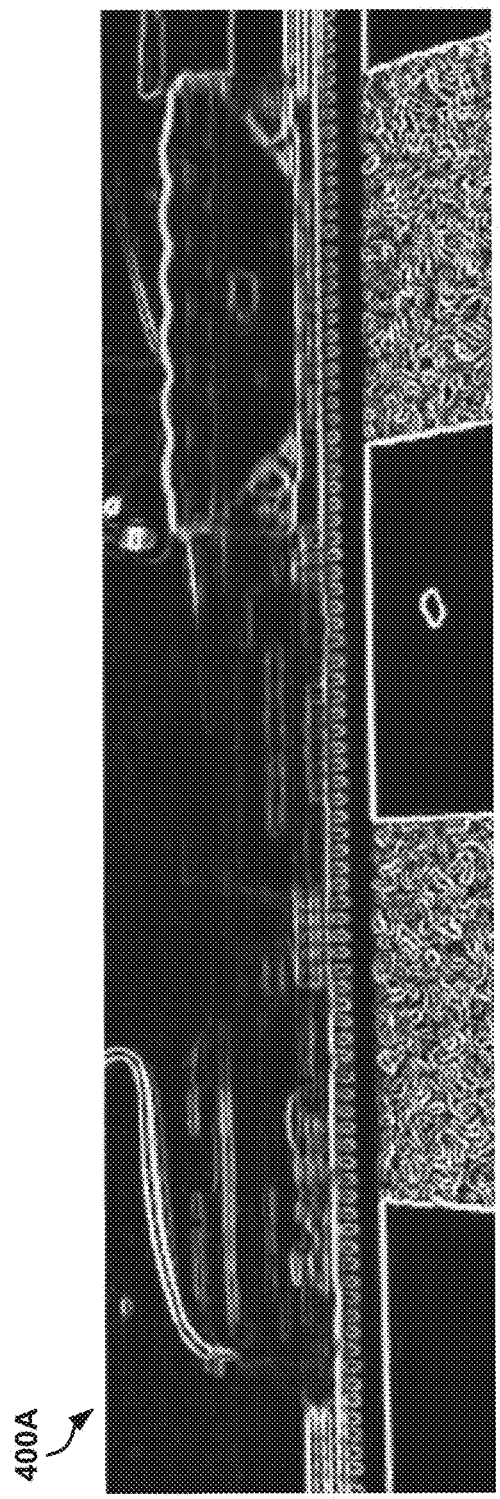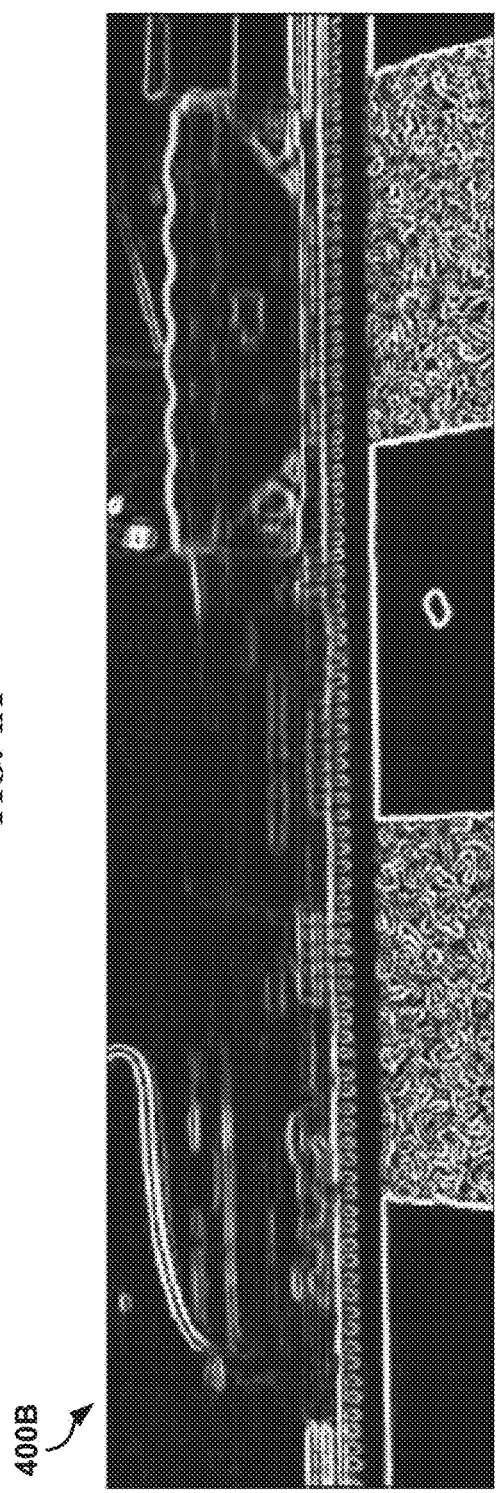
FIG. 4A
FIG. 4B

SYSTEMS AND METHODS FOR 3D POINT CLOUD PROCESSING

TECHNICAL FIELD

Embodiments discussed herein generally relate to systems and methods for reducing computation in extracting a three-dimensional (3D) point cloud from an image (e.g., a photograph or video frame).

BACKGROUND

A point cloud of an object is a set of points that defines a surface (e.g., a visible surface) of the object. Point clouds are used in many applications including creating a 3D model of the object for manufacturing, animation, or visualization purposes. The 3D model can be used for metrology or quality control purposes, among many others. 3D point cloud creation consumes a large number of computer resources and can consume a large amount of computer time.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 2A illustrates, by way of example, a histogram of a number of occurrences versus a value for the color red of a pixel in a frame of a series of frames.

FIG. 2B illustrates, by way of example, a histogram of a number of occurrences versus a value for the color green of the pixel in the frame of the series of frames.

FIG. 2C illustrates, by way of example, a histogram of a number of occurrences versus a value for the color blue of the pixel in the frame in the series of frames.

FIG. 4A illustrates, by way of example, an image of edges extracted from the frame of FIG. 3B, in accord with one or more embodiments.

FIG. 4B illustrates, by way of example, an image of edges extracted from the frame of FIG. 3C, in accord with one or more embodiments.

DETAILED DESCRIPTION

Figure 1:
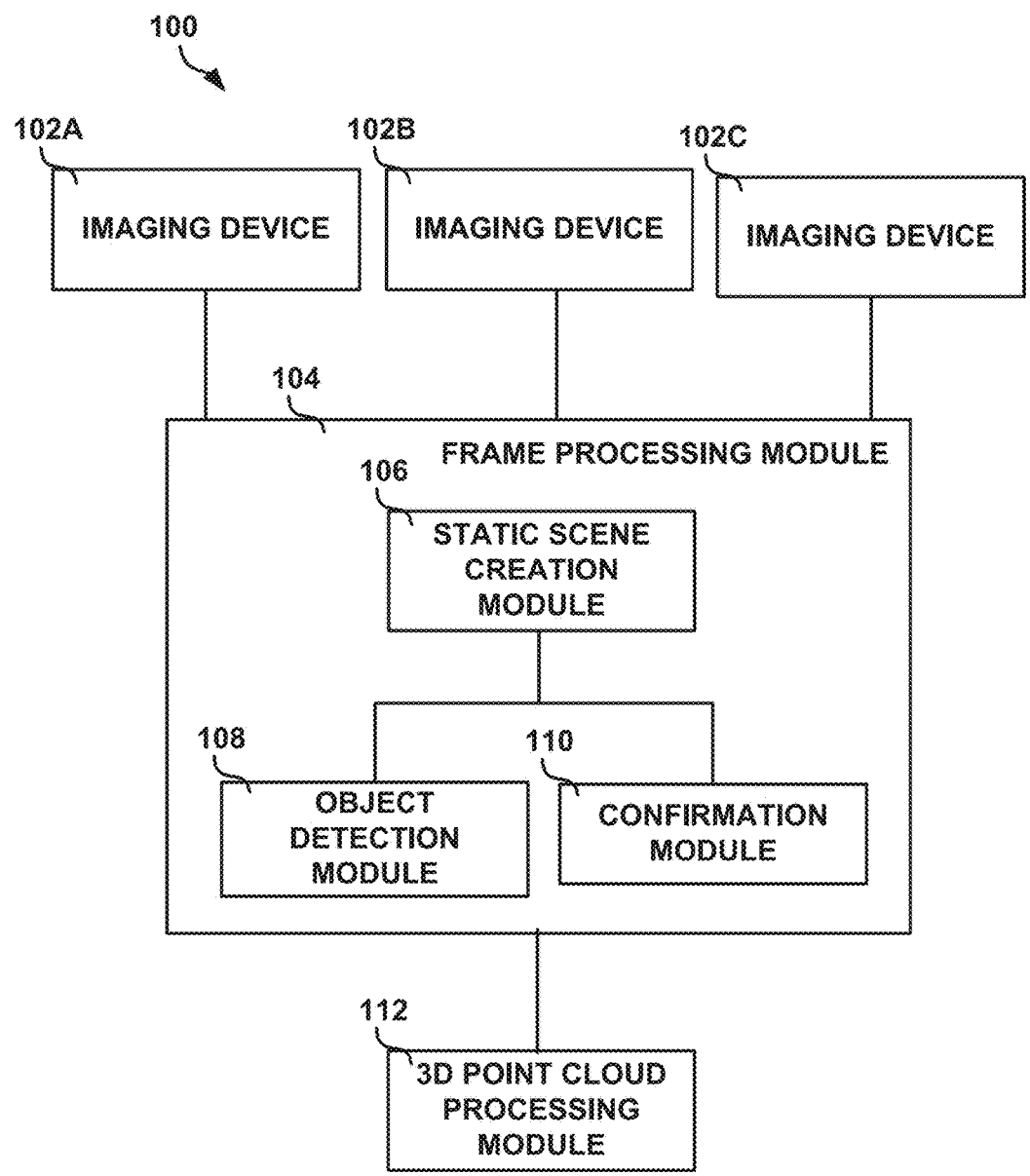
FIG. 1 illustrates, by way of example, a block diagram of a system for 3D point cloud processing, in accord with one or more embodiments.

Embodiments in this disclosure generally relate to creating a 3D point cloud of a scene. One or more embodiments may help in reducing an amount of time or an amount of computer resources it takes to produce a 3D point cloud of a scene, such as a scene that includes one or more moving objects therein.

The processing required to perform 3D point cloud extraction from frames captured by static cameras can be reduced by identifying one or more moving objects in a frame and only extracting and updating the 3D point cloud in the regions in and/or around the moving objects. The static 3D point cloud can be extracted once for the static scene and updated to include the moving objects.

Consider a static array of imaging devices. As used herein a "static imaging device" is a device fixed in location, orientation, and zoom that is capable of producing frame data that represents the scene in the field of view (FOV) of the imaging device. The imaging device is intended to remain still, but external forces, such as vibrations or bumping, can shift the imaging device's location and/or orientation. If such a shift is to occur, a new reference frame should be computed for the imaging device that shifted. A reference frame representing the static scene can be generated for each of the imaging devices in the array. The reference frame can be produced using a series (or a group) of frames from each respective imaging device. A 3D point cloud of the static scene can be generated. A moving object can be detected in a frame (a frame in the series of frames or a subsequent frame) by comparing pixels in a frame to pixels in the static frame. A mask can be created for regions of the frame that are deemed to be unchanged. The mask can be provided to a 3D point cloud generation module, such that a point cloud is only regenerated in the regions of the scene that need it (i.e. in locations in and/or around where an object is detected to be moving).

The static reference scene can be computed from a central value of the intensity of each pixel in the scene. The static reference scene can be used in at least two ways. First, the static reference scene can be used for change detection, such as to detect a moving object in the FOV of an imaging device. The static reference scene pixel values can be subtracted from respective current frame pixel values to reveal a candidate moving object. Second, the static reference scene can be used to suppress static edges in two frames prior to correlation, thus allowing for accurate measurement of the motion of the moving object even when that object has moved one or more pixels between frames.

A 3D point cloud extraction technique can be sped up by updating the 3D point cloud of the scene only in the regions containing moving objects. The new 3D point cloud technique can be capable of extracting a 3D point cloud with every frame so that moving objects are extracted as well as stationary objects. Instead of updating the 3D point cloud using every pixel of every frame, a faster approach (assuming the scene includes some non-moving object) is to identify pixels associated with the moving objects in the frame data and only update the point cloud in the region in and/or around the pixels associated with the moving object.

FIG. 1 illustrates, by way of example, a block diagram of a system 100 for 3D point cloud processing, in accord with one or more embodiments. The system 100 as illustrated includes a plurality of imaging devices 102A, 102B, and 102C communicatively coupled to a frame processing module 104 that includes a static scene creation module 106, an object detection module 108, and a confirmation module 110. The output of the frame processing module 104 can be used by a 3D point cloud processing module 112 to produce a 3D point cloud of one or more moving objects in a frame captured by the imaging device(s) 102A-C. While the system 100 is illustrated as including three imaging devices 102A-C, the system 100 can include any number of imaging devices, two or more, sufficient to produce frame data that can be used to produce a 3D point cloud.

The imaging devices 102A-C can be video cameras capable of creating pixel data corresponding to a field of view (FOV) of the camera at fixed intervals (e.g., a number of frames per second). The imaging devices 102A-C can be picture cameras capable of creating pixel data corresponding to a field of view (FOV) of the camera at non-fixed intervals (e.g., on demand). The imaging devices 102A-C can be arranged about a scene to be filmed, such as in an array, such as to capture multiple frames of a mostly common FOV.

The frame processing module 104 can receive frame pixel data from the imaging devices 102A-C. The frame processing module 104 determines which pixels in a FOV of an imaging device 102A-C correspond to an object that has moved since a previously captured frame.

The frame processing module 104 includes the static scene creation module 106. The static scene creation module 106 receives a series of frames (i.e., frame pixel data) from each of the imaging devices 102A-C. The static scene creation module 104 can produce a static reference frame for each of the imaging devices 102A-C. The static reference frame created for each imaging device 102A-C can be created using the received series of frames. The static scene module 106 can, for each imaging device, determine a central value for each color (e.g., red, orange, yellow, green, blue, indigo, violet, white/black, etc.) of each pixel of the series of frames, such as by determining a mode and/or average value for each color of each pixel, if the camera is a visible spectrum camera. Cameras that can take pictures in the non-visible light spectrum may also be used in one or more embodiments, such as an infrared or other wavelength camera. In such embodiments, a central value for each pixel can be determined without the need for determining the value for each color (e.g., specific subset of frequencies of light). For example, the static scene creation module 106 can determine central values for red, green, and blue for each pixel of the series of frames received from each of the imaging devices 102A-C. The static scene created for each of the imaging devices 102A-C can include the central values for each of the pixels. Each of the pixels of the static reference frame can include a central value for each of the colors.

In one or more embodiments, the central value can include a mode and/or average of the pixel values. In one or more embodiments, the central value can include an average value of pixels centered around or including a mode of the pixel value of the color. Consider the histograms 200A, 200B, and 200C of red, green, and blue pixel values of a single pixel shown in FIGS. 2A, 2B, and 2C, respectively. Shown in the histograms 200A-C is a number of occurrences of specific values of an 8-bit, three color scheme. Thus, each color of the pixel has a value of zero to two hundred fifty-five. The height of the bar for a specific pixel value corresponds to the number of times the pixel had that value in the series of frames. The taller the bar, the more times the pixel had the corresponding value. In the examples of FIGS. 2A-C, the pixel was occluded in some of the frames and unoccluded in the majority of the frames of the series of frames used to create the static reference scene.

Consider an embodiment where the mode of each color is used as the value for the color in the pixel of the static scene. For the red and green colors of this example, the mode is a good indicator of the value for red and green since there is a specific value of these colors that occurs significantly more frequently than other values of that same color. However, for the blue value in the pixel, there are two values of blue that both appear to be near maximum. In such a case, taking the mode of the pixel value may not accurately represent the central value of the color. One way to account for multiple maximums or other situations where the mode may not be an accurate representation of the central value is to determine a sum of counts of values in a sliding window and use an average of a weighted sum of the values in the sliding window where each value is weighted by the number of occurrences of the respective value. For example, consider a pixel with seventeen potential values [0, 16] with a respective number of occurrences in a series of reference frames of [16, 27, 48, 13, 40, 47, 46, 30, 29, 23, 22, 27, 20, 18, 19, 17]. Thus, value "0" appeared as the pixel value 16 times in the series of reference frames, value "1" appeared as the pixel value 27 times in the series of reference frames, and so on. A summing window of any size greater than one can be applied to the values, and the window corresponding to the highest sum can be used to determine the value for the pixel. In this example, assuming a summing window of size five, the highest sum captured by the summing window occurs when the summing window is centered about the value "4". The sum of these five values ([2, 6]) is 194 (48+13+40+47+46). The weighted average of these values is 84.15 ((48*2+13*3+40*4+47*5+46*6)/194). Thus, the value 84 (84.15 rounded down) can be used as the central value in this example. Note that if the numbers of occurrences of a value and/or the window size were different, the result may not be the center of the window and may be a different value of the pixel altogether.

Using such a technique, the value used for blue for this example in the static reference scene can be closer to the higher valued maximum than the lower valued maximum (the maximum further right in the diagram) in the example of FIG. 2C.

The static frame is created by determining a central value for each color of each pixel over the series of reference frames. The number of frames in the series of frames used to create the static reference scene needs to be large enough to ensure that each pixel corresponds to the static scene (i.e. is not occluded by a moving object a high enough percentage of the time so that the mode in the histogram is associated with the unoccluded version of the pixel normally present in the frame). There will be variations in pixel value in some environments, such as outdoor environments where the pixel values will vary throughout the day depending on the amount of light and/or cloud conditions. In such situations, multiple static scenes may be created to account for the light variation throughout the day. Each of the multiple static scenes can correspond to a different period of time in a given day. For example, in an indoor setting where a light runs on a timer, there can be a static scene corresponding to the time the light is on, and a static scene corresponding to the time the light is off.

One advantage of using the central value for each color of each pixel of the series of frames is a less-noisy image or a less-noisy 3D point cloud of the static scene. Using the central value acts as a sort of noise filter for the frame data. The static scene frame generally includes less noise than the individual frames in the series of reference frames.

The object detection module 108 receives the reference static frame data and compares subsequent frame data captured from the same imaging device 102A-C to the static frame data, such as to extract an object from the subsequent frame. Since the imaging devices' positions and orientations are static (presumably not changing) a moving target can be detected by comparing a video frame captured by the imaging device 102A-C to the static frame of the imaging device 102A-C.

The object detection module 108 computes the difference in pixel values between the imaging device's current frame and the static reference frame for that imaging device. For each pixel it computes the maximum absolute difference over each of the colors (e.g., in the example of red, green, and blue, the object detection module 108 computes the difference in pixel values for all three colors, respectively). The object detection module 108 then compares the computed differences to a threshold to determine if the pixel value has sufficiently changed.

The threshold can be determined statically or dynamically. For example, a user can determine that any change in pixel value is sufficient and the threshold can be set to one. In another example, a user can determine that a small change in pixel is not sufficient and may set the static threshold higher, such as to ten or more. A dynamic threshold can be determined by updating the threshold based on the pixel values of the frame that is the subject of the comparison. For example, the differences can be aggregated and only the differences that are within a specified percentile of the aggregated values can be considered sufficient. A user can specify that only the values in the seventieth percentile and greater correspond to a sufficient change, thus the threshold can be set to the difference of the corresponding to about the seventieth percentile (e.g., the difference corresponding to the seventieth percentile plus or minus one or a few value points). The object detection module 108 eliminates all pixels whose maximum difference is less than (or equal to) the threshold. The object detection module 108 accumulates the pixels greater than (or equal to) the threshold into contiguous segments and computes the size of each segment. Pixels in segments that include a number of pixels less than (or equal to) another threshold can be eliminated by the object detection module 108. The object detection module 108 can expand each segment by a fixed number of pixels (e.g., in all directions), such as to help ensure that all the pixels corresponding to the object are retained even if some of the pixels were determined to be less than the difference threshold.

The pixels corresponding to detected objects are provided to the confirmation module 110. The confirmation module 110 helps ensure that the detected object is moving. The confirmation module 110 can be helpful because a moving object may have temporarily (or permanently) stopped in the FOV after being in motion previously. This can happen, for example, when a car stops at a red light or pulls into a parking place and stops, or when a ball comes to a rest in the FOV. Because the object does not appear in the static reference frame it will be identified by the object detection module 108 as a change with each new frame even though it is not currently moving. Even if the static image is updated periodically this situation can still occur at some frame between updates.

The confirmation module 110 can register the pixels of a detected object from the current frame to pixels of the previous frame to determine if the object is moving. The confirmation module 110 can correlate pixels (e.g., edge pixels) from the detected object with edges from the previous frame. If the registered pixel shift is [0, 0] and there is no rotation, then the object is not moving. However, if the registered shift is non-zero or there is a rotation the movement can be confirmed.

A correlation metric implemented by the confirmation module 110 can include using a sum of an edge magnitude times the phase match over all the pixels used in the correlation. The best translation occurs where the edges from both frames line up so that they are in the same position and orientation.

What follows is a general explanation of some considerations and implementation examples in correlation technique. Note that these are just examples, and many other edge detection and correlation techniques exist and can be used with one or more embodiments discussed herein. Consider a single imaging device that has captured a frame in which there is a detected region in the imaging device's field of view (FOV) that we think has changed between a frame and the static image. Correlation between two images from the imaging device can be performed to determine if the object that was determined to be moving is actually moving. If the correlation measures a shift of zero pixels in row and zero pixels in column, then the object has not moved from one frame to the next and there is no reason to update the point cloud in that region of the FOV.

A technique for determining an edge in pixel data includes determining a gradient magnitude and phase values of relatively high magnitude edge pixels in the image region from each of two consecutive frames. One example of a gradient operator is a 3×3 Sobel operator. The Sobel operator computes an intensity gradient at a pixel by calculating an intensity difference in the column direction and an intensity difference in the row direction. These are denoted herein as "col response" and "row response", respectively. The magnitude of the gradient at the pixel is obtained by taking the Euclidean distance of the two responses, i.e., the square root of ((row response)$_2$ +(col response)$_2$) and the direction of the edge (or the phase) is given by arctan((col response)/(row response)). The angle given by the arc tangent corresponds to the direction pointing from the dark side to the light side and perpendicular to the edge. Note that other gradient operators can be used, such as can include a 3×3 or 5×5 Prewitt operator.

Note that the pixels determined to be associated with a change region may not include an entire moving object and may include some pixels from the reference frame. The edges in the static portion of the scene will correlate to [0, 0] offset since they are not moving. Such pixels in the correlation can hinder determining if the change pixels correspond to a moving object by confusing the correlation process. These edges and/or their magnitudes can be determined by also comparing their strength and phase direction to that of the same pixel in the reference frame. If the gradient direction is very similar and the frame pixel's gradient magnitude is not stronger (or much stronger) than the reference frame's gradient magnitude, then the magnitude of the pixel can be suppressed (i.e. reduced) so it has a negligible influence on the correlation results.

A goal of correlation can include identifying a subset of pixels (e.g., a sparse subset, such as about ten percent or other percentage) in the first frame's change region. It can be advantageous to use pixels with the strongest gradient magnitudes and/or using edges that are not all running in the same direction (e.g., pixels with the same phase). Using edges all running in the same direction can cause the correlation to be prone to registration errors along that direction. The pixels to be used in the correlation can be given all the pixels an equal weight or at least some of the pixels can be given a different weight (e.g., by giving the pixels with higher magnitude more weight). The pixels chosen from the first frame are held fixed relative to each other and are "moved around" as a rigid group when correlating with the next frame. For example, to compute the correlation at an offset of [−2, +3] every pixel location is shifted by −2 in row and +3 in column. The correlation value is the sum of the correlation metric over all the shifted pixels with the next frame at the shift location. One or more correlation metrics that can be used at a given pixel offset include the gradient magnitude at the shifted pixel in the next frame and the phase match between the input pixel's gradient phase and the gradient phase in the next frame at its shifted position. The phase match is a function of the absolute angle difference between the two gradient directions, where the best match is when the gradient directions of the two pixels are running in the same direction and the worst match is when the gradients are pointing in exact opposite directions. The strongest correlation occurs when the rigid group of pixels lines up on edges in the next frame with the same gradient direction as the corresponding pixels in the previous frame. If some offset (in row and column) gives the largest correlation metric, then that offset is considered to be the correlation location and the object is considered to be moving if the offset is not [0, 0].

In an embodiment in which the object detection module 108 expanded the aggregated pixels determined to correspond to an object, some of the static reference frame may be included in the change region. Including portions of the static reference frame can add error to the edge correlation process because those edges of the static reference frame will most likely register as zero pixel shift and no rotation and will reduce the overall probability of correctly detecting a shift between frames. The pixels corresponding to the static reference frame in the expanded aggregated pixels can be suppressed by comparing the edge magnitude and edge orientation of each of the expanded aggregated pixels against the magnitude and orientation of the pixels in the static reference frame. If a pixel (e.g., an edge pixel) in the frame has a similar orientation to the corresponding pixel in the static reference frame, then the edge magnitude in the frame pixel can be reduced by, for example, dividing the pixel magnitude by the edge magnitude of the pixel in the static image.

The 3D point cloud processing module 112 can use the pixel data corresponding to a detected object from the objection detection module 108 that is not removed by the confirmation module 110 to produce a 3D point cloud representation of the object. The 3D point cloud processing module 112 can implement any 3D point cloud rendering technique, such as the Intersect™ Dimension 3D point cloud extraction algorithm from Raytheon Company of Waltham, Mass., United States or another 3D point cloud extraction technique.

Figure 3A:
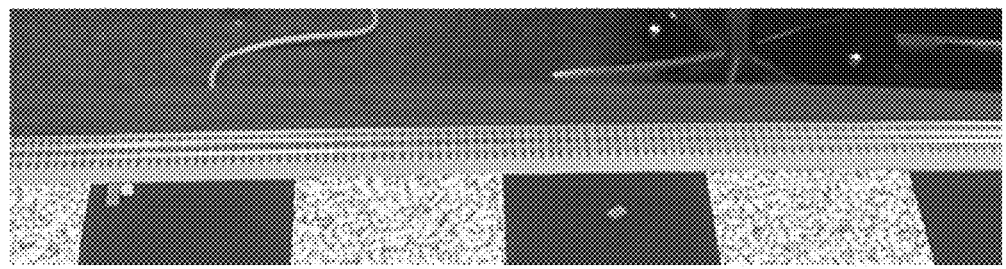
FIG. 3A illustrates, by way of example, a static scene reference frame, in accord with one or more embodiments.
Figure 3B:
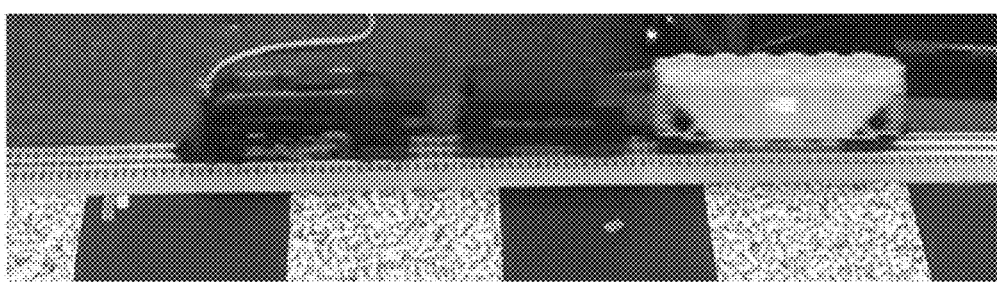
FIG. 3B illustrates, by way of example, a frame captured after the creation of the static scene reference frame of a FIG. 3A, in accord with one or more embodiments.
Figure 3C:
FIG. 3C illustrates, by way of example, a next frame captured after the frame of FIG. 3A was captured, in accord with one or more embodiments.

The operations of the static frame creation module 106, the object detection module 108, and the confirmation module 110 are now further described with regard to an example of a series of frames that include a model train moving along a train track. FIG. 3A illustrates, by way of example, a diagram of an embodiment of a static reference frame 300A. FIG. 3B illustrates, by way of example, a diagram of an embodiment of a frame 300B captured after the static reference frame 300A was created. FIG. 3C illustrates, by way of example, a diagram of an embodiment of a later frame 300C captured after the frame 300B. The static reference frame 300A can be created by the static frame creation module 106, such as by determining a central value of each color of each pixel in a series of reference frames. The train in the frame 300C is a little further along the track (further left in the FOV of the imaging device) than the train in the frame 300B.

FIG. 4A illustrates, by way of example, a frame 400A depicting all edges extracted (e.g., by the confirmation module 110) from the frame 300A. FIG. 4B illustrates, by way of example, a frame 400B depicting all edges extracted from the frame 300C. Both of the frames 400A-B depict all edges extracted, including some edges that are present in the static reference frame, not just edges that correspond to a detected object. By only using edges that are present in pixels corresponding to a detected object, the number of pixels to be processed and the computation complexity can be reduced.

Figure 5A:
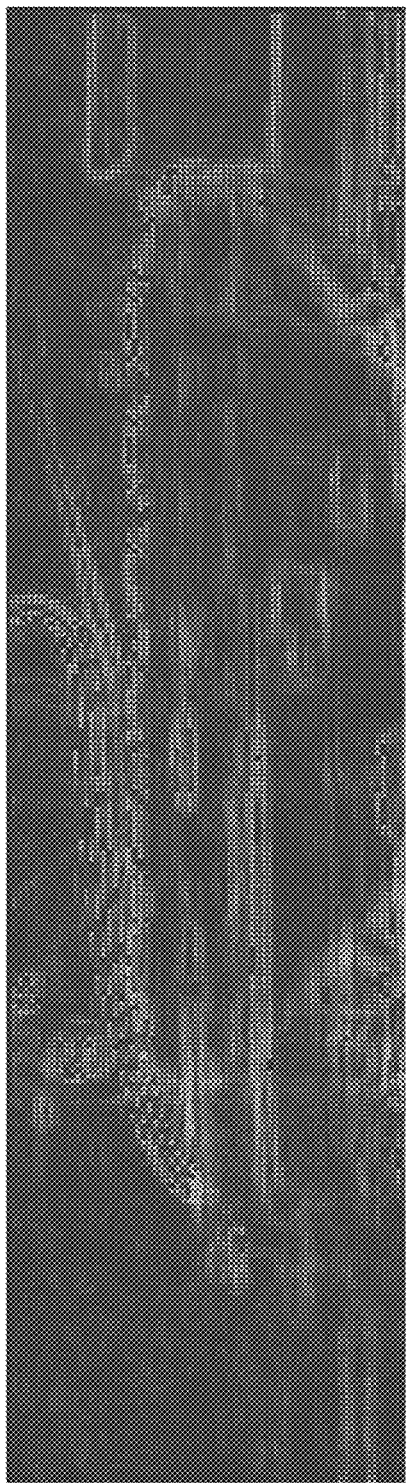
FIG. 5A illustrates, by way of example, an image of edges extracted from a portion of the frame illustrated in FIG. 3C, in accord with one or more embodiments.
Figure 5B:
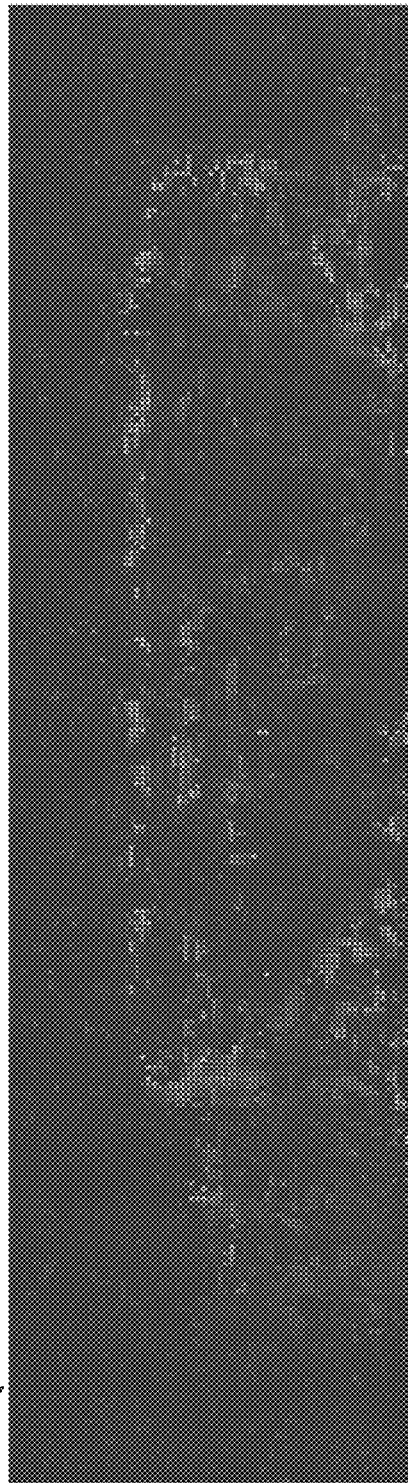
FIG. 5B illustrates, by way of example, an image of edges illustrated in FIG. 5A after an edge suppression technique has been applied to the edges of FIG. 5A, in accord with one or more embodiments.

FIGS. 5A and 5B illustrate, by way of example, a diagram 500A of edges extracted from a portion of the frame 300C and a diagram 500B after edges that are common with the static reference frame 300A are suppressed from the diagram 500A, respectively. In the diagram 500B, the majority of the edge pixels associated with the static reference frame 300A pixels are reduced in magnitude or eliminated altogether, leaving mostly pixels on edges associated with the train in the diagram 500B. Though it is not shown in the FIGS., the suppression of pixels has a similar effect on the frame 300B.

Figure 6A:
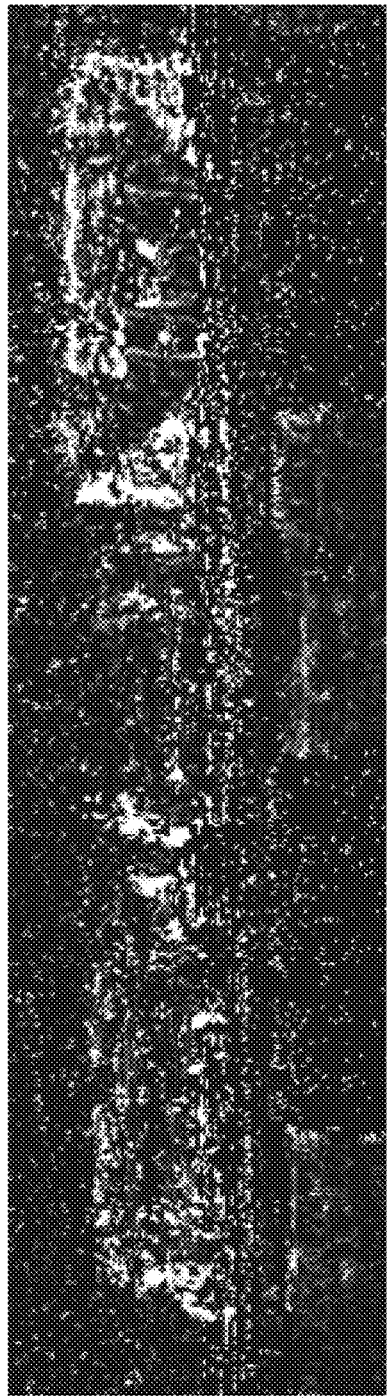
FIG. 6A illustrates, by way of example, an image of the frame illustrated in FIG. 3B after edge extraction and suppression techniques have been applied to the frame, in accord with one or more embodiments.
Figure 6B:
FIG. 6B illustrates, by way of example, an image of the frame illustrated in FIG. 3C after edge extraction and suppression techniques have been applied to the frame, in accord with one or more embodiments.

FIG. 6A illustrates, by way of example, a frame 600A of edge pixels from the frame 300B after suppression of pixels in common with the static scene frame 300A. FIG. 6B illustrates, by way of example, a frame 600B of edge pixels from the frame 300C after suppression of the pixels in common with the static scene. As can be seen, the pixels in the frame 600B are shifted to the left a number of pixels relative to the pixels in the frame 600A. The confirmation module 110 can determine the amount of shift required to best match the edge pixels from the frame 600A to the frame 600B. A non-zero translation confirms that the train (the object) is moving.

Figure 7A:
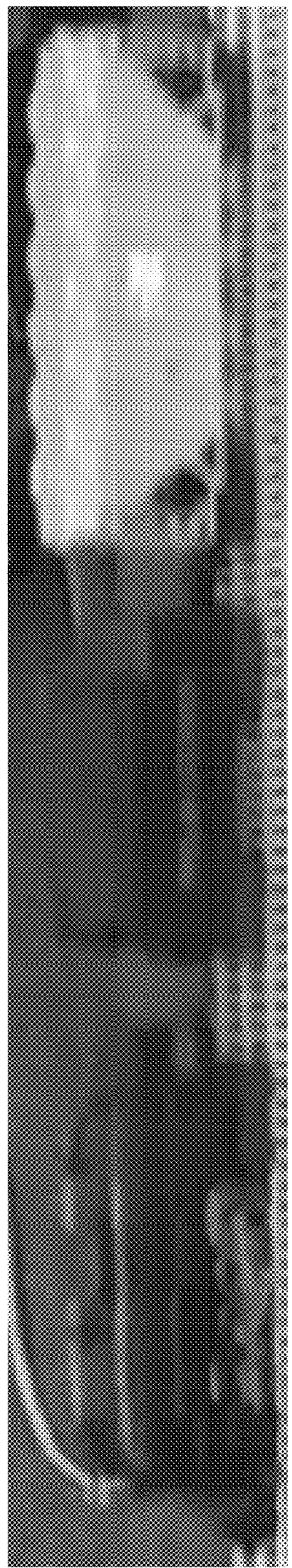
FIG. 7A illustrates, by way of example, an image of pixels extracted from the frame illustrated in FIG. 3B for 3D point cloud processing, in accord with one or more embodiments.
Figure 7B:
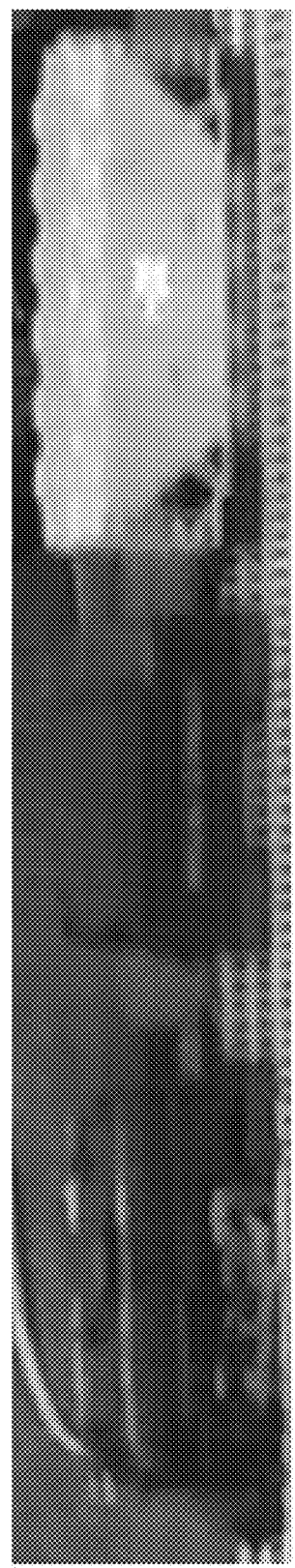
FIG. 7B illustrates, by way of example, an image of pixels extracted from the frame illustrated in FIG. 3C for 3D point cloud processing, in accord with one or more embodiments.

FIG. 7A illustrates an example of pixels extracted from the frame illustrated in FIG. 3B for 3D point cloud processing. FIG. 7B illustrates an example of pixels extracted from the frame illustrated in FIG. 3C for 3D point cloud processing. As can be seen, the techniques discussed herein detected the pixels in and around the train as corresponding to a moving object. These pixels corresponding to the moving object are provided to the 3D point cloud processing module 112 for updating the 3D point cloud in an area corresponding to those pixels. Note that the examples shown in FIGS. 7A-B provide more pixels to the 3D processing module 112 than are detected as corresponding to a moving object. This is to help ensure that all of the pixels corresponding to the moving object are provided to the 3D processing module 112, such as to help in providing a better 3D point cloud than would be created without the additional pixels.

In an imaging device array, such as can include the imaging devices 102A-C, the imaging devices may not be perfectly synchronized with respect to the times that they capture frame data. Consider two imaging devices with frame rates of 60 frames per second. The cameras could be capturing frames up to $1/120$ seconds apart. While this may not seem like a significant amount of time, the train in the examples of the FIGS. 3B and 3C moves about two pixels in that amount of time. This difference can affect the accuracy of the 3D point cloud created using the 3D point cloud processing module 112. Such variation can result in a poor and noisy point cloud because the train is not in the same physical location in each captured frame because of the mis-synchronization. To further synchronize the imaging devices or correct for the mis-synchronization of the imaging device 102A-C, the motion of an object can be leveraged. The extraction of the object pixels and a measurement of the direction and/or speed of the object can provide data that allows for correction of the synchronization error and thus helps in obtaining a more accurate and less noisy point cloud.

One advantage of the disclosed systems and methods can include reducing the number of false alarms (e.g., where an object is detected as moving and there is no actual movement). The effect of a false alarm is on execution time and not the accuracy of the resulting 3D point cloud. The penalty for a false alarm is duplicating work by extracting a 3D point cloud for a portion of the scene that does not need to be updated because the point cloud was previously extracted.

Another advantage of the disclosed systems and methods can include reducing processing time required to update a 3D point cloud of a scene. The reduction in execution speed is proportional to the amount of the scene that is determined to be unchanged from the static frame. If more of the frame is determined to be the same as the static scene, then there will be fewer pixels to be updated in the 3D point cloud. For the example of the moving train discussed herein, updating the 3D point cloud took about three seconds per frame whereas a 3D point cloud extraction of an entire frame can take multiple minutes to complete.

Figure 8:
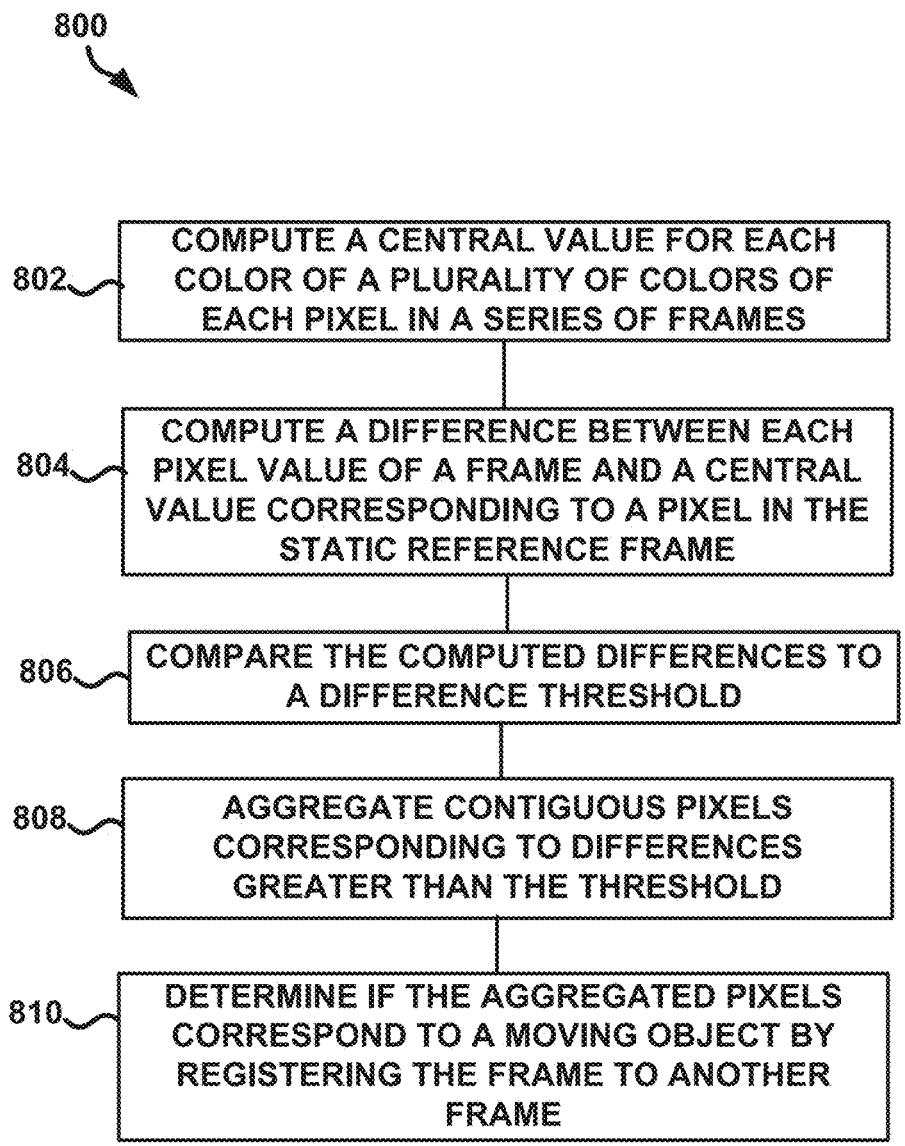
FIG. 8 illustrates, by way of example, a flow diagram of a method for organizing news event data, in accord with one or more embodiments.

FIG. 8 illustrates, by way of example, a flow diagram of an embodiment of a method 800. The method as illustrated includes: computing a central value for each color of a plurality of colors of each pixel in a series of frames, at operation 802; computing a difference between each pixel value of a frame and a central value of a corresponding pixel in the static reference frame, at operation 804; comparing the computed differences to a threshold, at operation 806; aggregating contiguous pixels corresponding to differences greater than the threshold, at operation 808; and determining if the aggregated pixels correspond to a moving object by registering the frame to a another frame (e.g., a previous or later frame, such as an immediately preceding or later frame), at operation 810.

One or more of the operations of the method 800 can be performed using a computer processor and or a module implemented using a computer processor. The series of frames at operation 802 can be received from a static imaging device. The method 800 can further include updating a 3D point cloud of a scene using aggregated pixels that are determined to correspond to a moving object. The method 800 can further include computing the size of each contiguous segment and eliminating a segment less than a threshold size. The method 800 can further include expanding a contiguous segment remaining after eliminating segments less than the threshold size, wherein expanding the segment includes adding pixels in the frame contiguous to the contiguous segment to expand the segment into a larger contiguous segment. The method 800 can further include comparing an edge magnitude and edge orientation of edges of the frame to the magnitude and orientation of edges in the static reference frame. The method 800 can further include reducing the magnitude of the edge pixel of the frame if the edge pixel has an orientation substantially the same as the orientation of a corresponding edge pixel of the static reference frame. Reducing the magnitude of the edge pixel of the frame can include dividing the magnitude of the edge pixel of the frame by a magnitude of the corresponding edge pixel in the static reference frame. The method 800 can further include correlating edges from each contiguous segment to edges of a preceding frame to determine a pixel shift indicating an amount the segment has shifted since the preceding frame including comparing the pixel shift to a threshold shift and determining that the segment corresponds to a moving object if the pixel shift is greater than the threshold.

Figure 9:
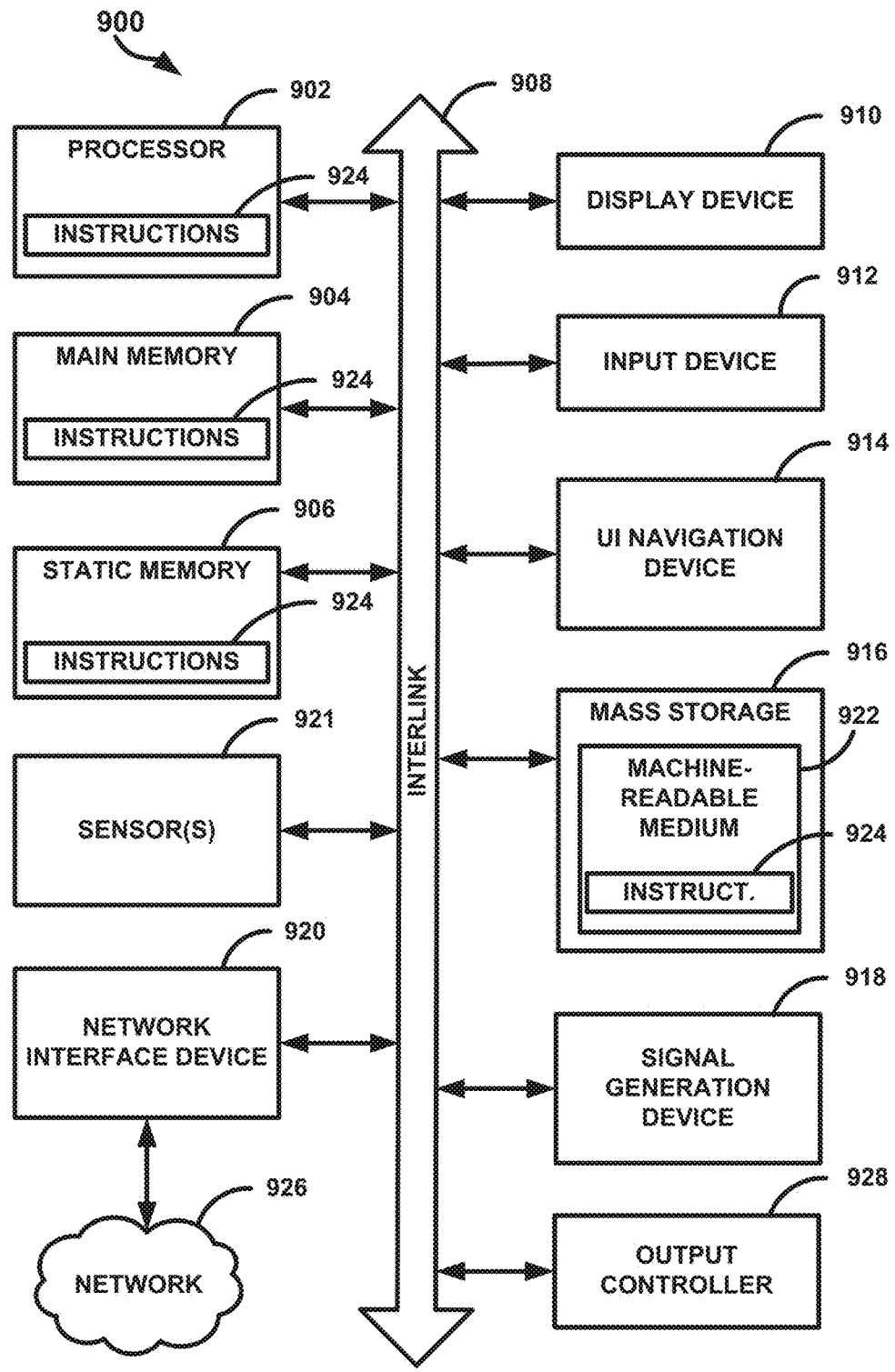
FIG. 9 illustrates, by way of example, a block diagram of a machine upon which one or more processes or operations (e.g., methods) discussed herein may be performed, in accord with one or more embodiments.

FIG. 9 illustrates, by way of example, a block diagram of an embodiment of a machine 900 upon which any one or more of the processes (e.g., methodologies) discussed herein may be performed. The imaging device 102A-C, frame processing module 104 (e.g., the static scene creation module 106, the object detection module 108, and/or the confirmation module 110), and/or the 3D point cloud processing module can be implemented using the machine 900. In one or more embodiments, the imaging device 102A-C, frame processing module 104 (e.g., the static scene creation module 106, the object detection module 108, and/or the confirmation module 110), and/or the 3D point cloud processing module can include one or more items of the machine 900. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware, such as circuitry and/or hardware processing circuitry (e.g., resistor(s), transistor(s), inductor(s), programmable logic, Boolean logic gates, multiplexer(s), Arithmetic Logic Unit(s) (ALU(s)), central processing unit(s) (CPU(s)), or the like). In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 900 can include a hardware processor 902 (e.g., a central processing unit (CPU), a graphics processing unit (GPU), a hardware processor core, or any combination thereof), a main memory 904 and a static memory 906, some or all of which can communicate with each other via an interlink (e.g., bus) 908. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 can include a machine readable medium 922 on which is stored one or more sets of data structures or instructions 924 (e.g., software) embodying or utilized by any one or more of the process or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute machine readable media.

While the machine readable medium 922 is illustrated as a single medium, the term "machine readable medium" can include a single medium or multiple media (e.g., a centralized or distributed database, and/or associated caches and servers) configured to store the one or more instructions 924.

The term "machine readable medium" can include any medium that is capable of storing, encoding, or carrying instructions for execution by the machine 900 and that cause the machine 900 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

Examples and Additional Notes

The present subject matter can be described by way of several examples.

Example 1 can include or use subject matter (such as an apparatus, a method, a means for performing operations, or a machine readable memory including instructions that, when performed by the machine, can configure the machine to perform acts), such as can include or use processing circuitry configured to execute instructions to implement modules comprising: a static scene creation module to compute a plurality of central values to create a static reference frame, one central value for each of a plurality of colors for each pixel in a series of frames from a static imaging device, each frame in the series of frames including pixel values of a scene captured by the static imaging device, an object detection module to compute a difference between each of a plurality of pixel values of a first frame captured by the static imaging device after the series of frames and a corresponding central value of a corresponding pixel in the static reference frame, compare the differences to a threshold, and aggregate contiguous pixels corresponding to differences greater than the threshold into contiguous segments of pixels, a confirmation module to determine if the contiguous segments correspond to a moving object by registering pixels of the frame to pixels of a frame preceding the first frame, and a three dimensional point cloud extraction module to update a three dimensional point cloud using the contiguous segments determined to correspond to the moving object.

Example 2 can include or use, or can optionally be combined with the subject matter of Example 1, to include or use, wherein the object detection module is further to compute the number of pixels in each contiguous segment and eliminate segments that include less than a threshold number of pixels.

Example 3 can include or use, or can optionally be combined with the subject matter of at least one of Examples 1-2, to include or use, wherein the object detection module is further to expand a contiguous segment remaining after eliminating segments less than a threshold size to include pixels contiguous to the segment in the first frame that correspond to differences less than the threshold to expand the segment into a larger contiguous segment.

Example 4 can include or use, or can optionally be combined with the subject matter of at least one of Examples 1-3, to include or use, wherein the confirmation module is further to correlate edges from each contiguous segment to edges of the frame preceding the first frame to determine a pixel shift indicating an amount the segment has shifted since the frame preceding the first frame.

Example 5 can include or use, or can optionally be combined with the subject matter of Example 4, to include or use, wherein the confirmation module is further to compare the pixel shift to a threshold pixel shift and determine that the segment corresponds to a moving object if the pixel shift is greater than the threshold.

Example 6 can include or use, or can optionally be combined with the subject matter of Example 5, to include or use, wherein the confirmation module is further to compare edge magnitude and edge orientation of edges of the first frame to a magnitude and orientation of edges in the static reference frame.

Example 7 can include or use, or can optionally be combined with the subject matter of Example 6, to include or use, wherein the confirmation module is further to reduce the magnitude of the edge pixel of the first frame if the edge pixel has an orientation substantially the same as the orientation of an edge pixel of the static reference frame.

Example 8 can include or use, or can optionally be combined with the subject matter of Example 1, to include or use, wherein reducing the magnitude of the edge pixel of the frame includes dividing the magnitude of the edge pixel of the first frame by a magnitude of the edge pixel in the static reference frame.

Example 9 can include or use subject matter (such as an apparatus, a method, a means for performing operations, or a non-transitory machine readable storage device including instructions that, when performed by the machine, can configure the machine to perform acts), such as can include or use computing, using a computer processor, a central value for each color of a plurality of colors of each pixel in a series of frames from a static imaging device to create a static reference frame, each frame in the series of frames including pixel values of a scene captured by the static imaging device, computing a difference between pixel values of a first frame captured after the series of frames by the static imaging device and a central value of a corresponding pixel value in the static reference frame, comparing the computed differences to a difference threshold, aggregating contiguous pixels corresponding to differences greater than the threshold into contiguous segments of pixels, determining if the contiguous segments correspond to a moving object by registering the contiguous segments to pixels of a frame preceding the first frame, and updating a three dimensional point cloud using the contiguous segments that are determined to correspond to the moving object.

Example 10 can include or use, or can optionally be combined with the subject matter of Example 9, to include or use computing the size of each contiguous segment and eliminating a segment less than a threshold size.

Example 11 can include or use, or can optionally be combined with the subject matter of at least one of Examples 9-10, to include or use expanding a contiguous segment remaining after eliminating segments less than the threshold size, wherein expanding the segment includes adding pixels in the first frame contiguous to the contiguous segment to expand the segment into a larger contiguous segment.

Example 12 can include or use, or can optionally be combined with the subject matter of at least one of Examples 9-11, to include or use comparing an edge magnitude and edge orientation of edges of the first frame to the magnitude and orientation of edges in the static reference frame, and reducing the magnitude of the edge pixel of the first frame if the edge pixel has an orientation substantially the same as the orientation of a corresponding edge pixel of the static reference frame.

Example 13 can include or use, or can optionally be combined with the subject matter of Example 12, to include or use, wherein reducing the magnitude of the edge pixel of the first frame includes dividing the magnitude of the edge pixel of the first frame by a magnitude of the corresponding edge pixel in the static reference frame.

Example 14 can include or use, or can optionally be combined with the subject matter of at least one of Examples 9-13, to include or use correlating edges from each contiguous segment to edges of the preceding frame to determine a pixel shift indicating an amount the segment has shifted since the preceding frame including comparing the pixel shift to a threshold shift and determining that the segment corresponds to a moving object if the pixel shift is greater than the threshold.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for three dimensional point cloud processing comprising:
    processing circuitry configured to execute instructions to implement modules comprising:
        a static scene creation module to compute a plurality of central values to create a static reference frame, one central value for each of a plurality of colors for each pixel in a series of frames from a static imaging device, each frame in the series of frames including pixel values of a scene captured by the static imaging device;
        an object detection module to compute a difference between each of a plurality of pixel values of a first frame captured by the static imaging device after the series of frames and a corresponding central value of a corresponding pixel in the static reference frame, compare the differences to a threshold, and aggregate contiguous pixels corresponding to differences greater than the threshold into contiguous segments of pixels;
        a confirmation module to determine if the contiguous segments correspond to a moving object by registering pixels of the first frame to pixels of a frame preceding the first frame; and
        a three dimensional point cloud extraction module to update a three dimensional point cloud using the contiguous segments determined to correspond to the moving object.

2. The system of claim 1, wherein the object detection module is further to compute the number of pixels in each contiguous segment and eliminate segments that include less than a threshold number of pixels.

3. The system of claim 2, wherein the object detection module is further to expand a contiguous segment remaining after eliminating segments less than a threshold size to include pixels contiguous to the segment in the first frame that correspond to differences less than the threshold to expand the segment into a larger contiguous segment.

4. The system of claim 1, wherein the confirmation module is further to correlate edges from each contiguous segment to edges of the frame preceding the first frame to determine a pixel shift indicating an amount the segment has shifted since the frame preceding the first frame.

5. The system of claim 4, wherein the confirmation module is further to compare the pixel shift to a threshold pixel shift and determine that the segment corresponds to a moving object if the pixel shift is greater than the threshold.

6. The system of claim 5, wherein the confirmation module is further to compare edge magnitude and edge orientation of edges of the first frame to a magnitude and orientation of edges in the static reference frame.

7. The system of claim 6, wherein the confirmation module is further to reduce the magnitude of the edge pixel of the first frame if the edge pixel has an orientation substantially the same as the orientation of an edge pixel of the static reference frame.

8. The system of claim 7, wherein reducing the magnitude of the edge pixel of the frame includes dividing the magnitude of the edge pixel of the first frame by a magnitude of the edge pixel in the static reference frame.

9. A method of producing a three dimensional point cloud comprising:
    computing, using a computer processor, a central value for each color of a plurality of colors of each pixel in a series of frames from a static imaging device to create a static reference frame, each frame in the series of frames including pixel values of a scene captured by the static imaging device;
    computing a difference between pixel values of a first frame captured after the series of frames by the static imaging device and a central value of a corresponding pixel value in the static reference frame;
    comparing the computed differences to a difference threshold;
    aggregating contiguous pixels corresponding to differences greater than the threshold into contiguous segments of pixels;
    determining if the contiguous segments correspond to a moving object by registering the contiguous segments to pixels of a frame preceding the first frame; and
    updating a three dimensional point cloud using the contiguous segments that are determined to correspond to the moving object.

10. The method of claim 9, further comprising computing the size of each contiguous segment and eliminating a segment less than a threshold size.

11. The method of claim 10, further comprising expanding a contiguous segment remaining after eliminating segments less than the threshold size, wherein expanding the segment includes adding pixels in the first frame contiguous to the contiguous segment to expand the segment into a larger contiguous segment.

12. The method of claim 11, further comprising:
    comparing an edge magnitude and edge orientation of edges of the first frame to the magnitude and orientation of edges in the static reference frame; and
    reducing the magnitude of the edge pixel of the first frame if the edge pixel has an orientation substantially the same as the orientation of a corresponding edge pixel of the static reference frame.

13. The method of claim 12, wherein reducing the magnitude of the edge pixel of the first frame includes dividing the magnitude of the edge pixel of the first frame by a magnitude of the corresponding edge pixel in the static reference frame.

14. The method of claim 9, further comprising correlating edges from each contiguous segment to edges of the preceding frame to determine a pixel shift indicating an amount the segment has shifted since the preceding frame including comparing the pixel shift to a threshold shift and determining that the segment corresponds to a moving object if the pixel shift is greater than the threshold.

15. A non-transitory computer readable storage device including instructions, which when executed by a machine, configure the machine to perform operations to compute a three dimensional point cloud of a scene, the operations comprising:
   compute a central value for each color of a plurality of colors of each pixel in a series of frames from a static imaging device to create a static reference frame, each frame in the series of frames including pixel values of a scene captured by the static imaging device;
   compute a difference between pixel values of a first frame captured after the series of frames by the static imaging device and a central value of a corresponding pixel value in the static reference frame;
   compare the computed differences to a difference threshold;
   aggregate contiguous pixels corresponding to differences greater than the threshold into contiguous segments of pixels;
   determine if the contiguous segments correspond to a moving object by registering the contiguous segments to pixels of a frame preceding the first frame; and
   update a three dimensional point cloud using the contiguous segments that are determined to correspond to the moving object.

16. The storage device of claim 15, further comprising instructions, which when executed by the machine, configure the machine to compute the size of each contiguous segment and eliminate a contiguous segment of the contiguous segments less than a threshold size.

17. The storage device of claim 16, further comprising instructions, which when executed by the machine, configure the machine to expand a contiguous segment of the contiguous segments remaining after eliminating segments less than the threshold size, wherein expanding the contiguous segment includes adding pixels in the first frame contiguous to the contiguous segment to expand the segment into a larger contiguous segment.

18. The storage device of claim 17, further comprising instructions, which when executed by the machine, configure the machine to:
   compare an edge magnitude and edge orientation of edges of the first frame to the magnitude and orientation of edges in the static reference frame; and
   reduce the magnitude of the edge pixel of the first frame if the edge pixel has an orientation substantially the same as the orientation of an edge pixel of the static reference frame by dividing the magnitude of the edge pixel of the first frame by a magnitude of the edge pixel in the static reference frame.

19. The storage device of claim 18, wherein the instructions for reducing the magnitude of the edge pixel of the first frame include instructions, which when executed by the machine, configure the machine to divide the magnitude of the edge pixel of the first frame by a magnitude of the corresponding edge pixel in the static reference frame.

20. The storage device of claim 15, further comprising instructions, which when executed by the machine, configure the machine to correlate edges from each contiguous segment to edges of the preceding frame to determine a pixel shift indicating an amount a contiguous segment of the contiguous segments has shifted since the preceding frame including comparing the pixel shift to a threshold shift and determining that the contiguous segment corresponds to a moving object if the pixel shift is greater than the threshold.

* * * * *